United States Patent
Tondu et al.

(10) Patent No.: US 11,639,047 B2
(45) Date of Patent: May 2, 2023

(54) GLAZING UNIT, IN PARTICULAR FOR AERONAUTICS, ABLE TO BE BLOCKED IN ITS RECEIVING OPENING IN THE EVENT OF BREAKAGE

(71) Applicant: SAINT-GOBAIN GLASS FRANCE, Courbevoie (FR)

(72) Inventors: Thomas Tondu, Saint-Martin-d'Abbat (FR); Jérôme Barbier, Isdes (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 207 days.

(21) Appl. No.: 16/769,931

(22) PCT Filed: Dec. 11, 2018

(86) PCT No.: PCT/FR2018/053203
§ 371 (c)(1),
(2) Date: Jun. 4, 2020

(87) PCT Pub. No.: WO2019/115931
PCT Pub. Date: Jun. 20, 2019

(65) Prior Publication Data
US 2021/0187913 A1    Jun. 24, 2021

(30) Foreign Application Priority Data
Dec. 13, 2017   (FR) ...................... 1771347

(51) Int. Cl.
*B32B 17/10* (2006.01)
*B64C 1/14* (2006.01)

(52) U.S. Cl.
CPC ...... *B32B 17/10293* (2013.01); *B64C 1/1492* (2013.01); *B32B 2333/12* (2013.01); *B32B 2605/18* (2013.01)

(58) Field of Classification Search
CPC . B32B 3/06; B32B 17/10293; B32B 2333/12; B32B 2605/18; B32B 17/1077;
(Continued)

(56) References Cited

U.S. PATENT DOCUMENTS 4,704,174 A * 11/1987 Valimont ............ B32B 17/1033
156/289
4,817,347 A * 4/1989 Hand ................ B32B 17/10293
219/203
(Continued)

FOREIGN PATENT DOCUMENTS

DE    3522811 A1 *  1/1987  .............. B60J 10/79
EP    0 236 045 A2    9/1987
(Continued)

OTHER PUBLICATIONS

International Search Report as issued in International Patent Application No. PCT/FR2018/053203, dated Mar. 22, 2019.

*Primary Examiner* — Nancy R Johnson
(74) *Attorney, Agent, or Firm* — Pillsbury Winthrop Shaw Pittman LLP

(57) ABSTRACT

A window pane includes at least one structural substrate referred to as interior substrate, intended to face toward a host structure within which the window pane is intended to be fixed, and having a face, referred to as interior face, wherein the interior face of the substrate includes, projecting therefrom and at the edge or near the edge and along at least one of the sides of the window pane, at least one male or female retaining element intended to collaborate with at least one respectively female or male retaining shape arranged in the host structure of the window pane.

18 Claims, 1 Drawing Sheet

(58) Field of Classification Search
CPC ...... B32B 17/100018; B32B 17/10045; B32B 17/10761; B32B 1/04; B32B 3/02; B32B 3/04; B32B 3/08; B32B 17/10005; B32B 17/10036; B64C 1/1492; E06B 7/232; E06B 1/12; E06B 3/12; E06B 3/60; E06B 3/9604; E06B 3/9649; E06B 3/9684; E06B 3/988

See application file for complete search history.

(56) References Cited

U.S. PATENT DOCUMENTS

| | | | | |
|---|---|---|---|---|
| 4,938,521 A | * | 7/1990 | Kunert | B32B 17/10036 52/204.597 |
| 5,062,248 A | * | 11/1991 | Kunert | B60J 10/265 52/394 |
| 5,613,325 A | * | 3/1997 | Mariel | B60J 10/74 49/404 |
| 9,103,155 B2 | * | 8/2015 | Salzmann | E06B 7/2312 |
| 11,104,211 B2 | * | 8/2021 | Takahashi | B60J 1/17 |
| 2008/0318011 A1 | * | 12/2008 | Chaussade | B32B 17/10045 428/210 |
| 2016/0031544 A1 | * | 2/2016 | Coraboeuf | B64D 15/00 244/129.3 |
| 2018/0111355 A1 | * | 4/2018 | Manz | C03C 17/42 |

FOREIGN PATENT DOCUMENTS

| | | | |
|---|---|---|---|
| FR | 2 575 976 A1 | 7/1986 | |
| FR | 2 909 921 A1 | 6/2008 | |
| GB | 729 573 A | 5/1955 | |
| WO | WO 90/12943 A1 | 11/1990 | |
| WO | WO 2014/183612 A1 | 11/2014 | |
| WO | WO-2016184732 A1 * | 11/2016 | ....... B32B 17/10036 |

* cited by examiner

GLAZING UNIT, IN PARTICULAR FOR AERONAUTICS, ABLE TO BE BLOCKED IN ITS RECEIVING OPENING IN THE EVENT OF BREAKAGE

CROSS-REFERENCE TO RELATED APPLICATIONS

This application is the U.S. National Stage of PCT/FR2018/053203, filed Dec. 11, 2018, which in turn claims priority to French patent application number 1771347 filed Dec. 13, 2017. The content of these applications are incorporated herein by reference in their entireties.

The invention relates to a window pane fixed by clamping in a cabin such as in the structure of an airplane, the window pane being able to be blocked in its host opening in the event of plies of the window pane breaking.

The invention will be described more particularly with reference to the aeronautical domain, although without being limited thereto.

An aeronautical window pane when made entirely out of plastic is secured to the structure of the airplane by being clamped, or preferably by being drilled and bolted.

In the case of a glass window pane, as this ought not to be drilled, it is fixed either by clamping of its peripheral edge and of its two opposite external faces, or alternatively is secured by interface elements which are bonded to the window pane and bolted to the structure of the airplane.

Bolted window panes are secured to the structure of the airplane and so all the deformations of the structure of the airplane which are caused by pressurization or by differential expansion effects, transfer stress onto the window panes, particularly in the region of the fixing zones. That necessitates stress management strategies which are complicated and may prove penalizing in terms of the mass and complexity of production, and also in terms of the associated cost. In addition, the cyclic mechanical stressing of the window panes degrades their life. Finally, bolting systems lead to additional bulk limiting visibility at the joints between the window panes.

On the other hand, window panes referred to as clamped are not very heavily mechanically loaded and are therefore fairly simply to produce and relatively reliable. On the other hand, in the event of breakage of all of the plies of the window pane, even though the clamped-fixing system is present, the window pane may become unseated from the structure and lead to a depressurization or even loss of the window pane. The larger the window pane and the smaller the width over which it is held in the structure and the higher the level of pressurization within the cabin of the airplane, the greater the risk of unseating and loss.

It is therefore an object of the invention to overcome the aforementioned disadvantages by proposing a clamped window pane fixing that in particular avoids any risk of the window pane becoming unseated from the window pane housing structure, whether the window pane is made of glass or of plastic.

According to the invention, the window pane comprises at least one structural substrate referred to as interior substrate, intended to face toward the host structure within which the window pane is intended to be fixed, and having a face, referred to as interior face, and is characterized in that said interior face comprises, projecting therefrom and at the edge or near the edge and along at least one of the sides of the window pane, at least one male or female retaining element intended to collaborate with at least one respectively female or male retaining shape arranged in the host structure (the opening in the host structure) of the window pane.

What is meant in the remainder of the description by "interior" in the qualifier relating to the part of the window pane that is furthest towards the outside of the window pane and facing towards the interior of the cabin in which the window pane is mounted.

The window pane is intended to be fixed by clamping of its exterior face (the face in contact with the exterior environment), and is able to slip under normal conditions of use (pressurization of the airplane and expansions of the window pane without damaging it).

Thus, the combination of the male/female element on the interior face of the window pane and of the female/male shape secured to the structure of the airplane on the side of the interior face of the window pane without this therefore being visible, affords, in the event of breakage of its plies, translational blockage as the window pane slips in a plane parallel to the main faces of the window pane. The first ply (interior ply) of the window pane fitted with the said at least one male/female element thus holds onto the window pane which cannot become unseated from the opening in the structure of the airplane as a result of the presence of a female/male shape in the structure.

The combination of the male/female element of the window pane and of the female/male shape of the host structure constitutes window pane retaining means retaining the window pane in an opposite direction to the host structure and parallel to the main faces of the window pane.

This solution also affords the following advantages: reduced bulk by comparison with a bolted solution, ease of embodiment, absence of drilling in the plastic plies, thereby eliminating any weakness, and a more lightweight design.

According to one preferred embodiment, the window pane comprises at least one structural substrate, referred to as interior substrate, intended to face toward the interior cabin of a host structure within which the window pane is intended to be fixed, and having a face, referred to as interior face, and is characterized in that it comprises several substrates arranged as a laminate and in that said interior face of the interior substrate comprises, projecting therefrom and at the edge or near the edge and along at least one of the sides of the window pane, at least one male or female retaining element intended to collaborate with at least one respectively female or male retaining shape arranged in the window pane host structure such that the female element constitutes a host housing creating abutment planes for the male element, the male element being intended to come into abutment in the housing parallel to the interior substrate and blocked laterally on its two sides.

According to one feature, the female element comprises a bottom (parallel to the overall plane of the window pane when the window pane is mounted in position) and side walls (running substantially at right angles to the bottom) and the male element intended to be housed in the female element is intended to come into abutment against the bottom of the female element (by the fixing of the window pane against the structure) and be sandwiched between the side walls of the female element (while at the same time leaving a clearance at least to one of the walls on the opposite side to the structure, such as a clearance of the order of 2 mm). The male element is intended to be compressed against the bottom of the female element when the window pane is mounted in position in its host structure.

According to a preferred alternative form of embodiment, the retaining element which is secured to the window pane is a male element, whereas the retaining shape which is intended to be secured to the host structure for which the window pane is intended is a female element. In this preferred embodiment, the female element constituting a host housing for the male retaining element is intended to be afforded by configuring the window pane host structure (for the final use of the window pane) for example the structure of an aircraft, the female element formed from said host structure comprising a bottom (parallel to the overall plane of the window pane when the window pane is mounted in position) and side walls (running substantially orthogonal to the bottom) and the male element intended to be housed in the female element being intended to be brought into abutment against the bottom of the female element (by the fixing of the window pane against the structure) and sandwiched between the side walls of the female element (while affording a clearance to at least one of the walls on the opposite side to the structure, such as a clearance of the order of 2 mm). The male element of the window pane is intended to be compressed against the bottom of the female element of the structure.

In its final use in the host structure, the window pane is intended to be fixed (unable to move and unable to slide in any way).

According to one feature, the retaining element when male has a cross section (in a plane perpendicular to the edge face of the window pane) of right overall shape.

According to one feature, the retaining element is a rigid (nondeformable, inelastic) component. This is not in any way a seal.

According to one embodiment, the window pane comprises several plies arranged as a laminate, preferably at least three plies, each ply comprising at least one substrate. The retaining element in a window pane comprising several plies is secured to the interior ply intended to be arranged directly facing the interior cabin of the host structure intended to accommodate the window pane. The retaining element in a window pane comprising several plies is, in particular, physically and mechanically independent of the exterior ply, the ply furthest opposite the ply to which said retaining element is secured. The interior ply comprises the interior substrate to which the retaining element is secured, said retaining element being secured only to said interior substrate. The retaining element thus has no return secured to the exterior ply (namely to the ply intended to face the exterior environment when the window pane is mounted in position in the structure).

The window pane comprises at least three laminated plies, a first ply referred to as interior ply to which the retaining element is secured, a second ply, and a third ply referred to as exterior ply, the second ply comprising a continuous zone or discontinuous zones of fixing of the window pane, the window pane being intended to be fixed by direct clamping of the second ply (directly against the fixing zone or zones of said second ply).

In particular, the window pane comprises at least three laminated plies, a first ply referred to as interior ply (the retaining element being secured to the interior ply), a second ply and a third ply referred to as exterior ply, which is set back in places, or preferably along its entire periphery, with respect to the edge of the second ply, creating discontinuous exterior surfaces or, for preference, one continuous peripheral exterior contact surface for the fixing of the window pane, the window pane being intended, in its position of use, to be fixed by the clamping of the second ply via the contact surface or surfaces (leading to compression of the male element in (the bottom of) the female shape, the male element being arranged opposite and facing the clamping contact surface).

According to one feature, said at least one retaining element is an added component which is secured to the interior face of the interior substrate, such as by bonding or bolting.

According to another feature, the interior structural substrate is made of glass or of plastic. In one exemplary embodiment, the interior structural substrate is made of plastic and said at least one retaining element is also made of plastic, being incorporated into the body of the substrate as a result of the monobloc manufacture of said substrate, particularly by thermoforming or molding.

For preference, said at least one retaining element comprises on its opposite face to the substrate a coating that encourages the slipping of said retaining element (and therefore of the window pane with regard to the deformation, the expansion of the window pane in the usual context of its use); the coating is for example the seal material. This seal allows said retaining element to slip with respect to the complementary and opposite retaining shape of the structure, whatever the material of said element.

According to another feature, said at least one retaining element extends as a projection with respect to the interior face of the substrate in a direction parallel or substantially parallel to the edge face of the window pane.

In one exemplary embodiment, the window pane comprises several individual retaining elements distributed along at least one side of the window pane, particularly along at least two opposite sides, preferably along the entire periphery of the window pane.

In another exemplary embodiment, the window pane comprises at least one continuous retaining element extending along the length of at least one side of the window pane, or a continuous element forming a surround along the entire periphery of the window pane.

According to the invention, when the window pane is mounted in position in its final destination, such as an opening (in order to close same) of a host structure, said retaining element is intended to collaborate with a complementary retaining shape configured to block the extraction of the retaining element in a plane parallel or substantially parallel to the main faces of the window pane.

In particular, the retaining shape of the host structure comprises an abutment plane which is arranged parallel to the wall of the opening of the structure accommodating the window pane. The invention also relates to an assembly comprising a structure, such as a structure of an aircraft of the airplane type, provided with at least one host opening, and an aforementioned window pane of the invention, the window pane being mounted in the structure in order to close the opening, the host opening comprising at least one retaining shape with which said at least one retaining element projecting from the interior face of the window pane collaborates.

According to one feature, the assembly is such that the retaining shape projects from the edge face/of the wall of the host opening, the retaining shape preferably being a female shape formed by two flanges, the first flange extending at right angles to the edge face of the opening, and the second flange running from the end of the first flange and parallel to the edge face, whereas the projecting element projecting from the window pane is a male element.

The invention will be described more particularly with reference to a male retaining element. Of course, the retaining element could be female, while projecting from the interior face of the window pane, while the retaining shape of the host opening would be a male shape.

The present invention is now described with the aid of purely illustrative examples that do not in any way restrict the scope of the invention, and on the basis of the attached illustrations, in which.

Figure 1:
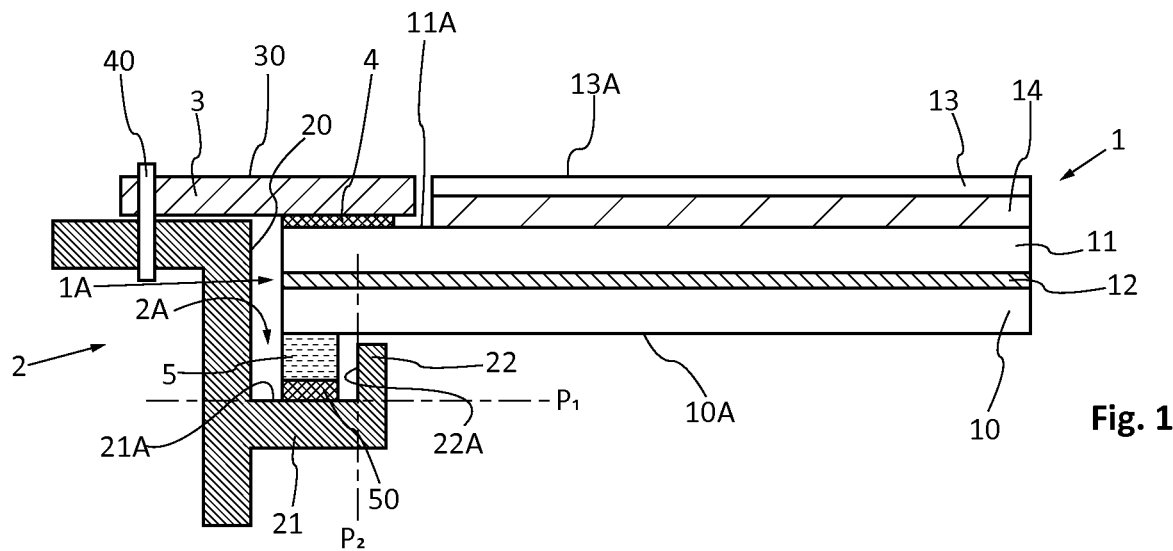
FIG. 1 depicts a schematic view from above, in partial section, of an assembly according to the invention comprising a window pane associated with the structure of an airplane.
Figure 2:
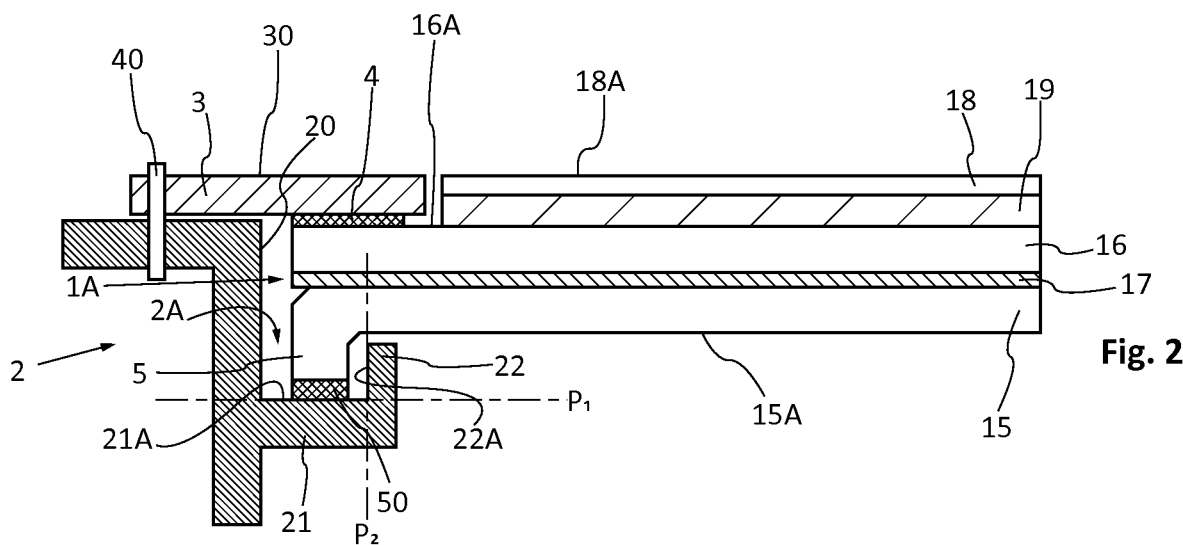
FIG. 2 is a schematic view from above in partial section of an assembly of the invention according to an alternative form of embodiment of the window pane.
Figure 3:
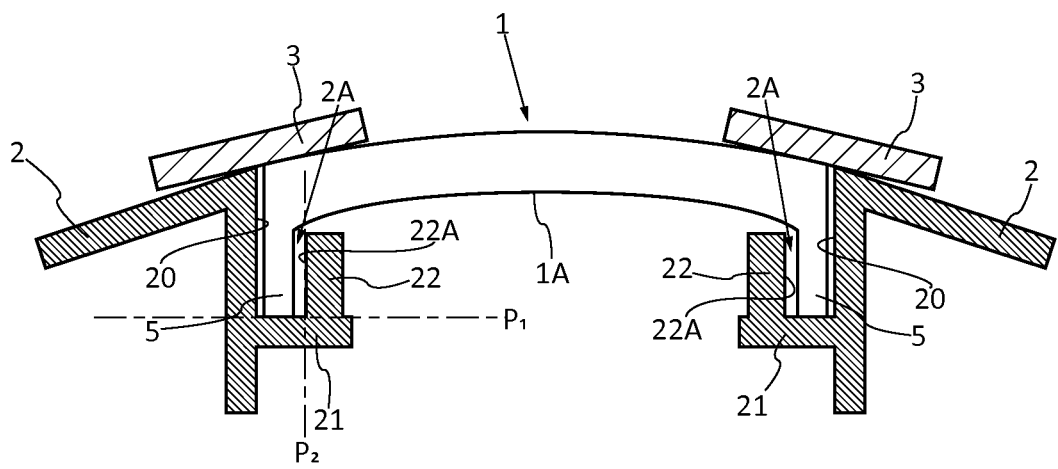
FIG. 3 is a schematic view from above in partial section of an assembly of the invention according to another alternative form of embodiment of the window pane, the window pane being curved.

The window pane 1 according to the invention and illustrated in FIGS. 1 to 3 is intended to be housed in the fuselage/structure 2 of an airplane.

In a known way, the window pane 1 comprises at least one ply, preferably several plies arranged as a laminate.

In the window pane example of FIG. 1, the window pane 1 comprises three plies, a first ply corresponding to a first substrate made of glass 10, preferably toughened (thermally or chemically toughened) glass, typically 8 mm thick, a second ply made up of a second substrate 11, likewise made of glass, preferably toughened and typically 8 mm thick, the two glass substrates 10 and 11 being secured to one another by an intermediary film 12 of the PVB type, and a third ply formed of a third glass substrate 13, typically 3 mm thick and of an interlayer 14, typically 6 mm thick made of plastic such as PU, the interlayer 14 connecting the second glass substrate 11 to the third glass substrate 13.

The third ply, a combination of the glass substrate 13 and of the interlayer 14, has in the known way surface-area dimensions smaller than those of two other plies, so as to allow the window pane 1 to be fixed to the structure 2 at least by clamping of the exterior face 11A of the second ply 11 using a pressing/fixing system 3.

The fixing system 3 is laid against the exterior face 11A of the second ply 11 via an interface seal 4. In order to hold the fixing system 3 firmly in place against the second ply 11 by clamping, said system 3 is secured to the structure 2 by bolting 40.

When the window pane is in the fixed position, the exterior face 13A of the window pane which corresponds to the exterior face of the third substrate 13 is coplanar with the external face 30 of the fixing system 3 bolted to the structure 2 of the airplane.

In the window pane example of FIG. 2, the window pane 1 comprises a first ply formed of a structural substrate made of plastic 15, such as PMMA and typically 15 mm thick, a second ply formed of a second structural substrate made of plastic 16, such as of PMMA, and typically 15 mm thick, secured to the first substrate 15 by a film interlayer 17 of the PVB type, and a third ply formed of a glass substrate 18 typically 3 mm thick and of an interlayer 19 typically 6 mm thick made of a plastic such as PU, the interlayer 19 connecting the plastic second substrate 16 to the glass substrate 18.

Likewise, to fix the window pane 1, the third ply has smaller surface-area dimensions in order to allow fixing by clamping of the exterior face 16A of the window pane which corresponds to the exterior face of the second ply 16.

A seal 40 is provided at the interface between the exterior face 16A of the second ply and the internal face of the fixing system 3.

In addition, when the window pane is mounted in position, the exterior face 18A is coplanar with the external face 30 of the fixing system 3 bolted to the structure 2 of the airplane.

In the schematic view of FIG. 3, the window pane 1 of the invention is not planar but curved. The window pane is depicted schematically without its plies.

According to the invention, the window pane 1 of FIGS. 1 to 3 comprises, on its interior face 10A, 15A and 1A, respectively, at least one projecting element 5 which in these examples forms a male element, whereas the structure 2 of the airplane comprises at least one shape/part 2A, here a female shape, intended to accommodate said male element 5.

In the position in which the window pane is fixed/clamped by the fixing system 3, the male projecting element 5 and the female shape 2A are designed to block translational movement of the window pane in a plane parallel or substantially parallel to the main faces of the window pane.

In the examples shown, the projecting element 5 is a male shape after the manner of a lug which, once housed in the female shape 2A, is laterally blocked.

According to the invention, the female shape 2A constitutes a host housing for the male element 5 and is derived from the structure 2, forming two abutment planes P1 and P2 for the projecting element 5 and therefore for the window pane 1. The plane P1 corresponds to the bottom of the housing 2A against which the free end of the male element 5 presses. The plane P2 corresponds to a side wall of the housing, perpendicular or substantially perpendicular to P1, and facing and some distance away from the edge face/wall/face 20 of the opening in the structure 2 in which the window pane is housed. The plane P2 acts as an abutment plane for the lateral face of the male element 5.

The male element 5 constitutes an added component secured to the interior face 10A of the window pane (the interior first ply of the window pane) or alternatively forms an integral part of the interior first ply of the window pane when the material of which it is made is the same as that of the structural substrate that forms said first ply.

For preference, in the case of the glass substrate 10 of FIG. 1, the male element 5 is an attached component secured to the glass. For example, the material of the male element 5 is metallic, such as a hollow element made of aluminum, a composite material such as phenolic cotton or epoxy glass, or a polymer material (PMMA, PC or the like). The male element 5 is secured for example by bonding.

In the example of FIG. 2 for which the structural substrate 15 of the first ply is made of plastic, the male element 5 is incorporated into the substrate by being shaped during the manufacture of the substrate, said element forming a return that is bent over with respect to the body of said substrate.

The female shape 2A constitutes a housing for the male element 5 which once introduced into said housing is able to slip against the bottom (the plane P1) of the housing in the event of slippage of the window pane in a plane parallel to the main faces of the window pane, while at the same time being in abutment on the opposite side to the structure of the airplane via the plane P2 of the side wall of said housing.

The first abutment plane P1 therefore corresponds to a plane parallel to the main faces of the window pane so that when the window pane is in the clamped position, the pressing of the fixing system 3 against the outside of the window pane 1 transmits a pressure force to the male element 5 pressing it against said plane P1.

The second abutment plane P2 corresponds to a plane perpendicular to the first plane P1 and some distance from the structure 2 so that in the event of the slippage of the window pane toward the outside of the structure 2 in a direction parallel to the main faces of the window pane, the window pane 2 can be retained by the element 5 coming into abutment against the plane P2 perpendicular to the main faces of the window pane. Thus, in the event of window pane plies breaking, the window pane, which has a tendency to bow toward the outside as a result of the pressurization of the cabin, is unable to become unseated.

The housing/the female shape 2A is secured to the structure 2 of the airplane.

The structure 2 of the airplane comprises, in the region of the opening in which the window pane 1 is housed, a face 20 referred to as a transverse face because it is transverse to the interior and exterior walls of the fuselage of the airplane. The edge face 1A of the window pane 1 is parallel to this transverse face 20. The structure 2 according to the invention comprises a first flange 21 perpendicular to the face 20 and a second flange 22 perpendicular to the first flange and secured to the distal end of this first flange, the two flanges creating the housing/the female shape 2A. The second flange 22 thus faces the transverse face 20 of the structure 2 of the airplane.

The exterior face 21A of the first flange 21 constitutes the first abutment plane P1 and therefore acts as a bearing/abutment surface for the male element 5. The face 22A of the second flange 22, which is a face facing the transverse face 20 of the structure 2, constitutes the second abutment plane P2 acting as an abutment surface in the event of slippage of the window pane in the opposite direction to the transverse face 20.

The female shape 2A has a width (dimension parallel to the main faces of the window pane and perpendicular to the transverse face 20 of the structure) that is such that a clearance is left at least on the lateral side of the male element 5 to the side wall 22A of the housing 2A on the opposite side to the structure 2. This clearance is, for example, of the order of 2 mm. It allows the window pane to deform and expand in the position of use.

The surface of the male element 5 in contact with the face 21A of the female shape 2A is such that the male element 5 can slip with respect to the surface of said face 21A. The slippage makes it possible to take account of the deformation and expansion of the window pane in the position of use.

Advantageously, the male element 5 comprises, on its face facing the first abutment plane P1, a coating 50 which is suitable for allowing said element to slip on the surface 21A of the housing/female shape 2A. This coating is, for example, a seal 50 made of EPDM, silicone, etc. The female shape 2A extends as a projection perpendicular to the transverse face 20 of the structure 2. When the window pane 1 is mounted in position, the female shape 2A with the end flange 22 extends as a projection with respect to the edge face 1A of the first and second plies of the window pane without, however, extending so far as to come into alignment with the edge face of the third ply.

For example, the female shape 2A with the flange 22 extends out to the order of 20 mm from the transverse face 20 of the structure 2.

By way of example, the male element 5 has a width (dimension parallel to main faces of the window pane and perpendicular to the edge face of the window pane) which is of the order of 10 mm. Its thickness (dimension transverse to the main faces of the window pane and parallel to the plane P2) is, for example, of the order of 10 mm.

The thickness of the male element 5 is such that, when combined with the depth of the female shape 2A, the free end of the end flange 22 does not touch the interior face 10A of the window pane.

The window pane may comprise (depending on the length of the sides of the window pane) several individual male elements 5 preferably distributed along at least two opposite sides of the window pane, more preferably still, along the entire periphery, whereas the structure 2 of the airplane comprises a plurality of associated individual female shapes/housings 2A opposite, or at least one continuous housing forming a peripheral groove running parallel to the structure 2, projecting from the opening that accommodates the window pane.

As an alternative, a male element 5 of the window pane may be continuous along at least one side of the window pane or even along the entire periphery of the window pane in the manner of a surround. The female shape 2A is then likewise continuous.

The female shape 2A which constitutes an extension projecting from the structure 2 of the airplane is, for example, added to the transverse face 20 of the structure by being secured by welding or bolting.

The invention claimed is:

1. An assembly comprising a host structure comprising at least one host opening, and a window pane,
    the host opening comprising at least one retaining shape that includes at least one female retaining element,
    the window pane comprising an interior structural substrate, which faces toward the host structure within which the window pane is fixed, and having an interior face,
    the window pane further comprising several substrates arranged as a laminate and said interior face of the interior structural substrate comprising, projecting therefrom and at an edge or near the edge and along at least one of the sides of the window pane, at least one male retaining element which collaborates with the at least one retaining shape arranged in the host structure of the window pane so that the female retaining element creates abutment planes for the male retaining element, the male retaining element being placed in abutment in the female retaining element parallel to the interior structural substrate and laterally blocked on its two lateral sides, wherein a clearance is present between at least one of the lateral sides of the male retaining element and the at least one female retaining element to allow the window pane to deform and expand during use,
    wherein said at least one male retaining element comprises on its opposite face to the interior structural substrate a slip coating.

2. The assembly as claimed in claim 1, wherein said at least one male retaining element is an added component which is secured to the interior face of the interior structural substrate.

3. The assembly as claimed in claim 2, wherein said at least one male retaining element is secured to the interior face of the interior structural substrate by bonding or bolting.

4. The assembly as claimed in claim 1, wherein the interior structural substrate is made of glass or of plastic.

5. The assembly as claimed in claim 1, wherein the interior structural substrate is made of plastic and said at least one male retaining element is also made of plastic, being incorporated into a body of the interior structural substrate as a result of the monobloc manufacture of said interior structural substrate.

6. The assembly as claimed in claim 5, wherein the at least one male retaining element is incorporated into the body of the interior structural substrate as a result of the monobloc manufacture of said interior structural substrate by thermoforming.

7. The assembly as claimed in claim 1, further comprising several male retaining elements distributed along at least one side of the window pane.

8. The assembly as claimed in claim 7, wherein the male retaining elements are distributed along the entire periphery of the window pane.

9. The assembly as claimed in claim 1, wherein the at least one male retaining element is a continuous retaining element extending along at least one side of the window pane, or a continuous retaining element forming a surround along the entire periphery of the window pane.

10. The assembly as claimed in claim 1, wherein the at least one female retaining element blocks the extraction of the at least one male retaining element in a plane parallel or substantially parallel to the main faces of the window pane.

11. The assembly as claimed in claim 1, wherein said at least one male retaining element is secured only to said interior structural substrate.

12. The assembly as claimed in claim 1, wherein the at least one retaining shape projects from the edge face of the host opening, the at least one female retaining element is formed by first and second flanges, the first flange extending at right angles to the edge face of the opening, and the second flange running from the end of the first flange and parallel to the edge face.

13. The assembly as claimed in claim 1, wherein the window pane comprises at least three laminated plies, a first interior ply to which the at least one male retaining element is secured, a second ply, and a third exterior ply referred, the window pane being fixed to the host structure by direct clamping of the second ply to the host structure.

14. The assembly as claimed in claim 1, wherein the coating is made of ethylene propylene diene monomer (EPDM) or silicon.

15. The assembly as claimed in claim 1, wherein the male retaining element is made of metal, a composite material, a polycarbonate or poly(methyl methacrylate).

16. The assembly as claimed in claim 1, wherein the male retaining element is made of metal or a composite material.

17. The assembly as claimed in claim 1, wherein the several substrates comprise an intermediate substrate and an exterior substrate, the intermediate substrate being located between the interior structural substrate and the exterior substrate, and the interior structural substrate, the intermediate substrate and the exterior substrate being laminated to each other to form said laminate, wherein each of the interior structural substrate, the intermediate substrate and the exterior substrate has an edge face that forms at least part of a periphery of the window pane, wherein the edge face of the exterior substrate is recessed relative to the edge face of the interior structural substrate and the edge face of the intermediate substrate so that, along at least part of the periphery of the window pane, a portion of a main face of the intermediate substrate that faces the exterior substrate is uncovered by the exterior substrate, and wherein said at least one male retaining element is arranged in a portion of the interior face of the interior substrate that is opposite the portion of the main face of the intermediate substrate that is uncovered by the exterior substrate.

18. The assembly as claimed in claim 1, wherein the clearance forms an empty space between the at least one of the lateral sides of the male retaining element and the at least one female retaining element.

* * * * *